United States Patent [19]

Csongor

[11] 3,942,773
[45] Mar. 9, 1976

[54] METHOD AND APPARATUS FOR EXTRUDING MELTED PLASTIC MIXTURES

[76] Inventor: Desider G. Csongor, 35 Wilson Road, Bedford, Mass. 01730

[22] Filed: July 8, 1974

[21] Appl. No.: 486,379

Related U.S. Application Data

[62] Division of Ser. No. 273,190, July 19, 1972, Pat. No. 3,836,127.

[52] U.S. Cl. ............................................. 259/191
[51] Int. Cl.$^2$ ........................................ B29B 1/06
[58] Field of Search ......... 259/191, 192, 193, 9, 10, 259/25, 26, 45, 46, 97; 425/204, 208, 209; 100/147, 150, 148

[56] References Cited
UNITED STATES PATENTS

| | | | |
|---|---|---|---|
| 2,068,220 | 1/1937 | Baechi | 259/193 |
| 2,595,210 | 4/1952 | Clinefelter | 259/193 |
| 2,817,876 | 12/1957 | Gandelli | 259/191 |

*Primary Examiner*—Robert W. Jenkins
*Attorney, Agent, or Firm*—Munroe H. Hamilton

[57] ABSTRACT

An improved method and apparatus for extruding plastic materials provides for processing a mixture of plastic particles, additives, dyes, and the like by means of an extruder screw to form a melted mass which is moved in a helically-directed stream in a confined space. At a predetermined point, flow-diverting means in said confined space abruptly changes the flow pattern. Portions of the helically-directed melted mixture advanced by the extruder screw and coming into contact with the flow-diverting means, undergo a continuous shearing action and sheared-away portions of the melted material are constantly turned over upon themselves and forced through restricted passageways of short axial length in a highly turbulent flow pattern. After leaving the restricted passageways, the melted material again moves in a helical path of flow. Turbulency thus induced at one or more points in the flow line brings together melted and unmelted particles more effectively and rapidly, and there is further accomplished an improved mixing together of the melted mixture and the additives and other components.

6 Claims, 19 Drawing Figures

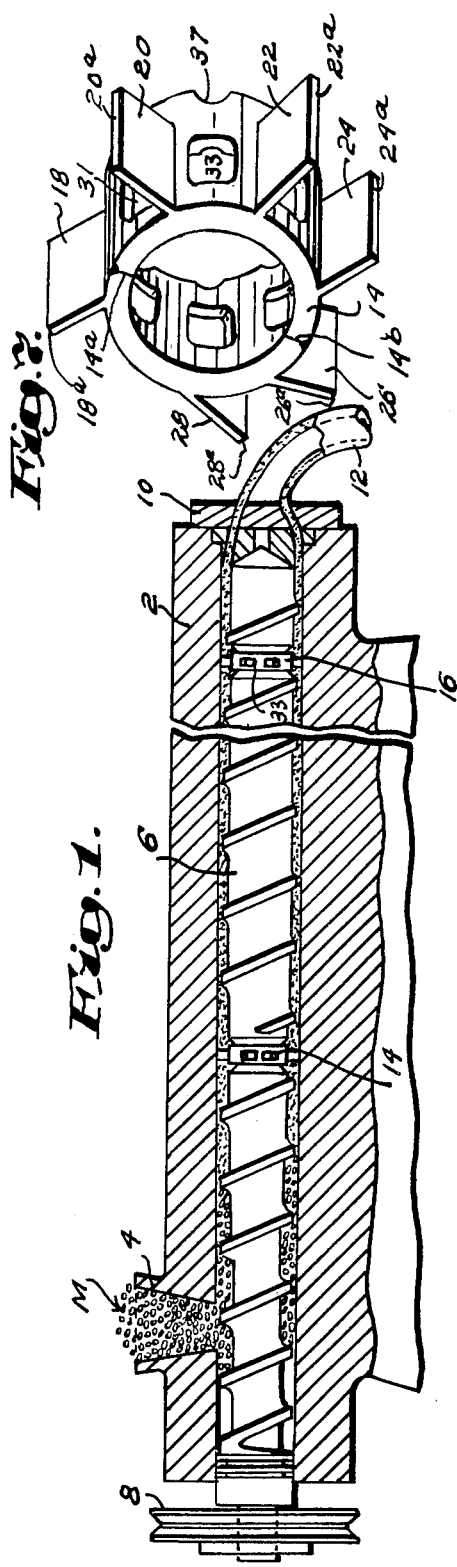
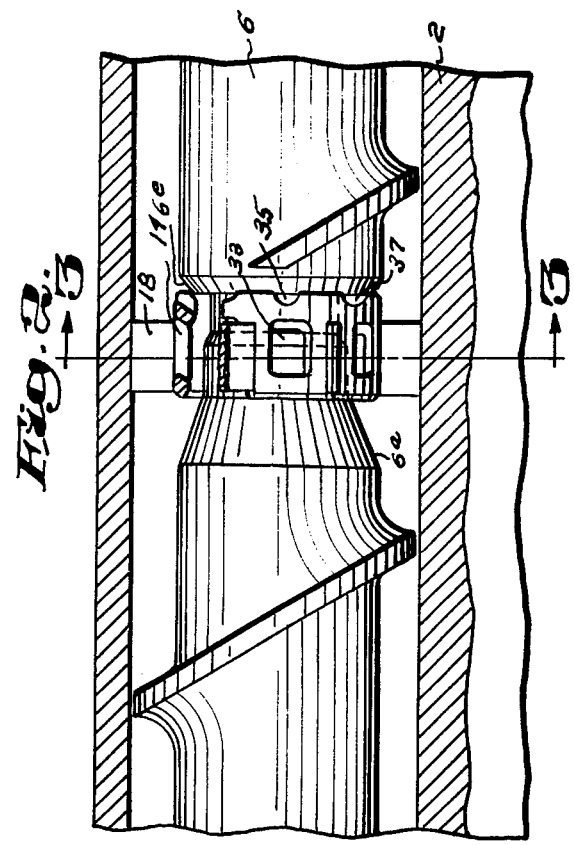
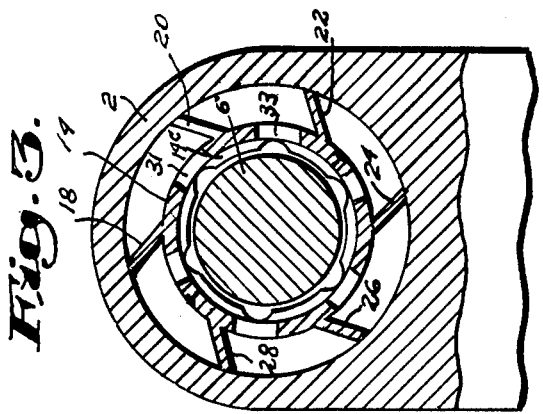

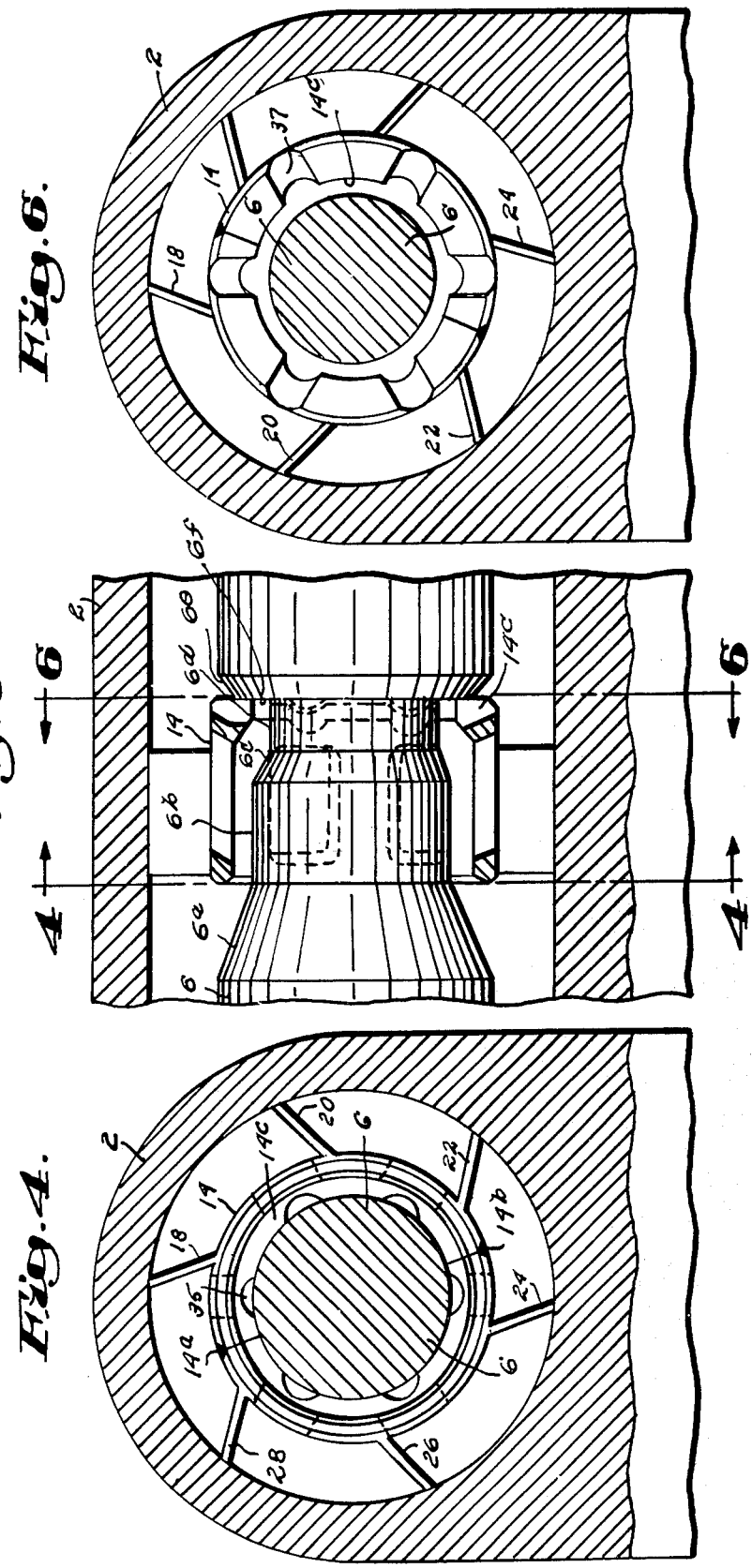

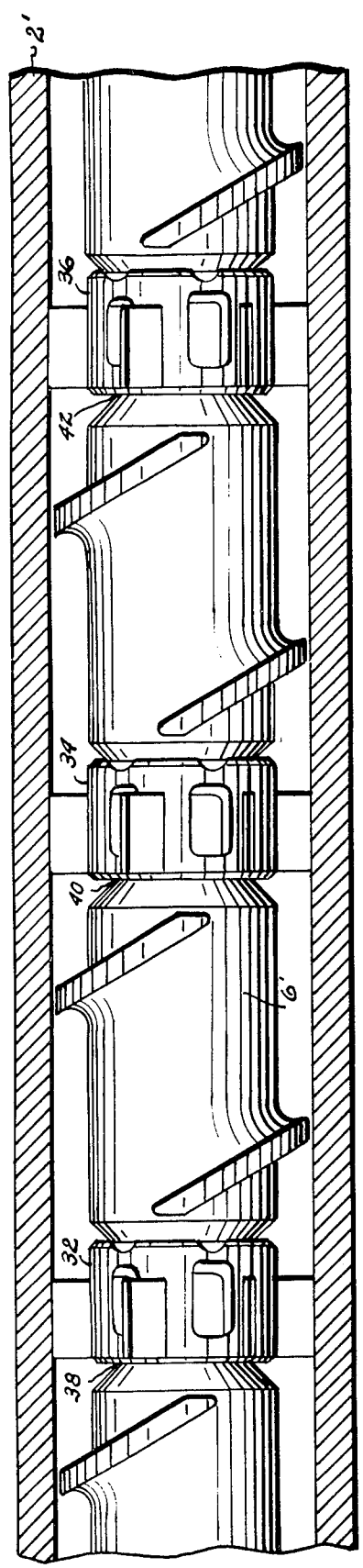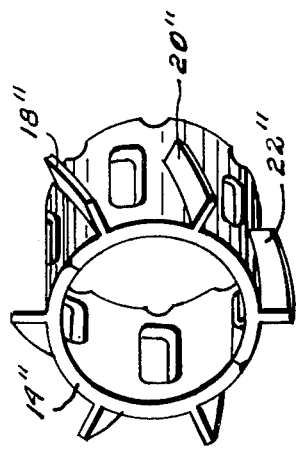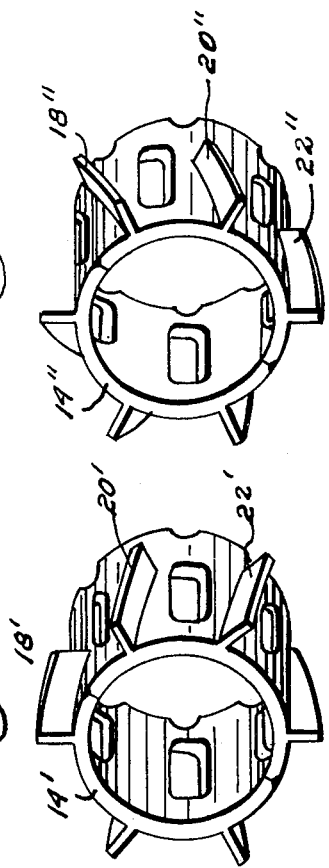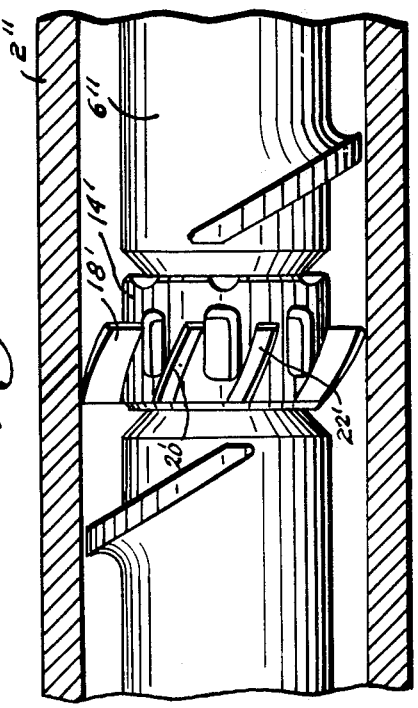

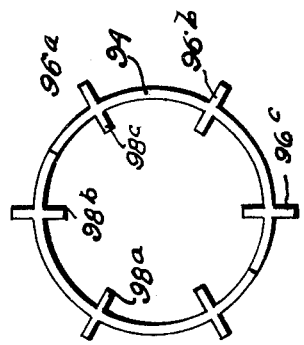
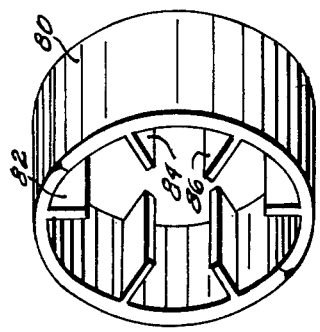
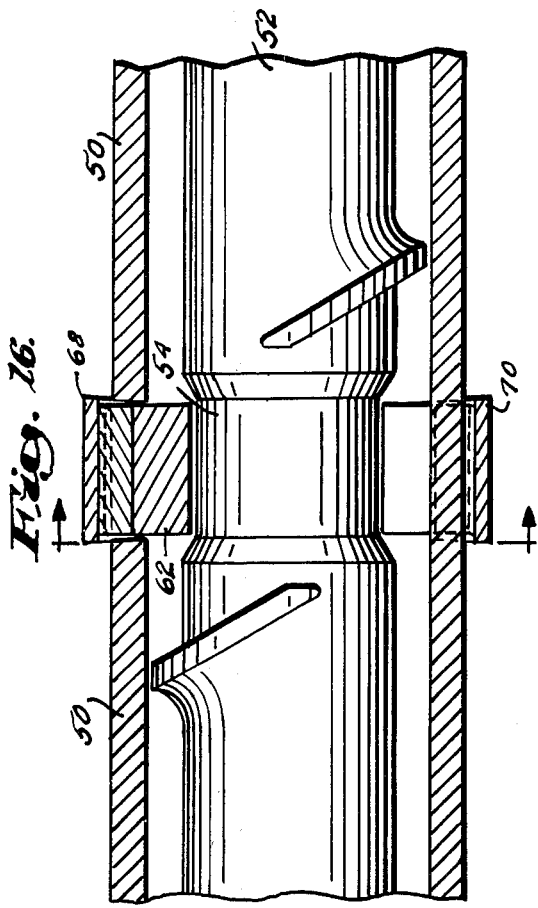
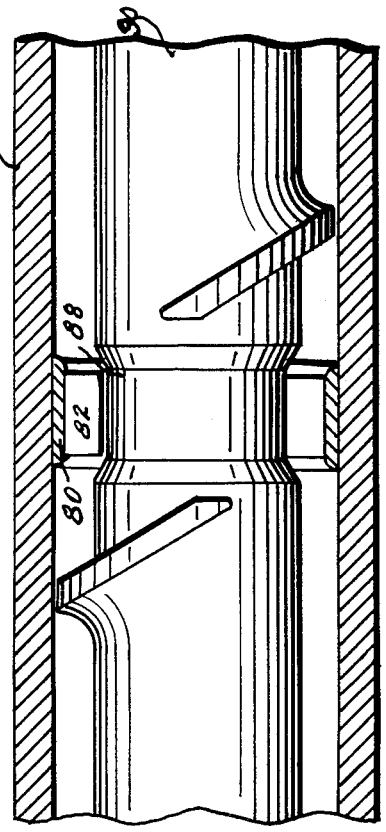
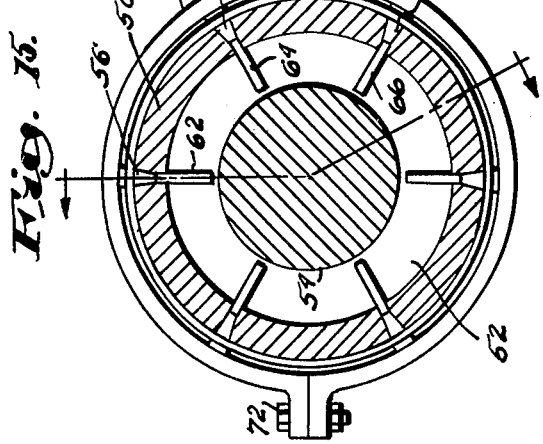

METHOD AND APPARATUS FOR EXTRUDING MELTED PLASTIC MIXTURES

This application is a divisional application of Ser. No. 273,190 filed July 19, 1972, and now issued as U.S. Pat. No. 3,836,127.

This invention relates to an improved method and apparatus for extruding plastic materials including mixtures of plastic materials, additives, dyes and the like, and more particularly, the invention is concerned with processing mixtures of plastic material and other components wherein melting of the materials is accomplished by generating suitably high melting temperatures through friction and compression exerted by means of an extruder screw in a cylindrical body of the class commonly referred to as an "extruder barrel".

It is found that processing of plastic materials in this manner may develop difficulties in bringing together melted and unmelted particles in a satisfactory manner, and in accomplishing a degree of mixing which provides for the incorporation of additives, dyes and other substances distributed in a substantially uniform manner in the molded product.

It is an object of the invention, therefore, to provide an improved method and apparatus for extruding plastic materials and to devise a mixing technique for more effectively bringing together and mixing melted and unmelted plastic materials in the presence of additives, dyes and the like.

Another object of the invention is to provide an improved extruder screw apparatus for processing plastic mixtures, and for inducing a turbulent flow pattern at one or more points in the path of flow of a melted mixture.

Another object is to provide an improved method of constructing and assembling an extruder screw apparatus.

Still another object is to provide a method and means for improving the quality and appearance of extruded plastic products.

The nature of the invention and its other objects and novel features will be more fully understood and appreciated from the following description of a preferred embodiment of the invention selected for purposes of illustration and shown in the accompanying drawings, in which:

FIG. 1 is a cross sectional view showing a plastic extruding screw apparatus and illustrating flow-diverting means of the invention combined therewith;

FIG. 2 is another cross sectional view illustrating the flow-diverting ring means of the invention on a somewhat larger scale;

FIG. 3 is a cross sectional view taken on the line 3—3 of FIG. 2;

FIG. 4 is a cross section taken on the line 4—4 of FIG. 5;

FIG. 5 is a fragmentary cross-sectional view of the flow-diverting means of the invention;

FIG. 6 is a cross-sectional view taken on the line 6—6 of FIG. 5;

FIG. 7 is a detail perspective view of the diverter ring means shown in FIGS. 1–5 inclusive;

FIG. 11 is a sectional view illustrating another form of extruder apparatus;

Figure 8:
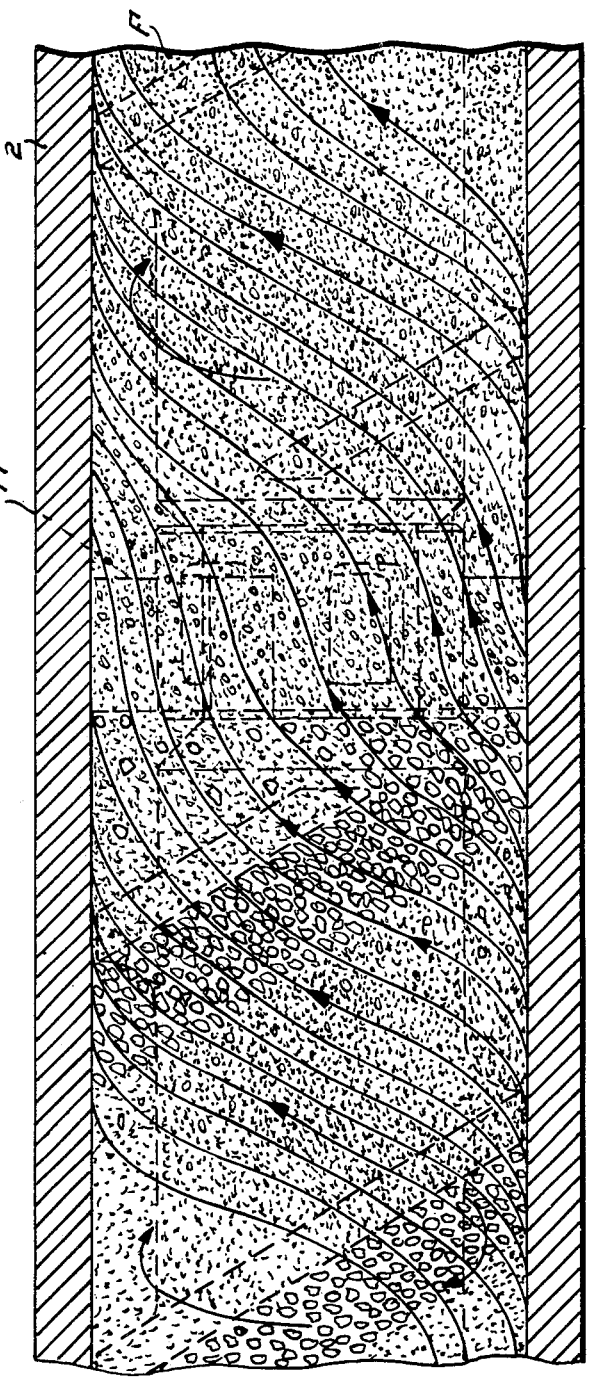
FIG. 8 is a diagrammatic view illustrating a helically directed flow of plastic material passing through the flow-diverting means of the invention.

FIGS. 12, 13, and 14 illustrate a modified form of diverter ring means in which diverter vanes are formed with a helical shape;

FIGS. 15 and 16 illustrate diverter vane means associated with an extruder barrel by a clamping device;

FIGS. 17 and 18 illustrate a further modification in which the diverter vanes are formed integrally of a diverter ring member;

FIG. 19 is still another detail modification in which diverter vane means extend both inwardly and outwardly of the ring member.

I have found that the objectives noted above may be realized to a very satisfactory degree by inducing a region of turbulency in a flow of melted material. In the invention method, a melted mixture of plastic material, additives, dyes and the like is moved through an extruder screw apparatus in a helically directed stream in the conventional manner. At a predetermined point or points, however, the flow pattern is abruptly interrupted by flow-diverting means. Portions of the melted mixture advanced by the extruder screw and coming into contact with the flow-diverting means undergo a continuous shearing action.

Sheared-away portions of the melted material are constantly turned over upon themselves and forced through restricted passageways of short axial length to induce a highly turbulent flow pattern. Turbulency thus induced at one or more separated points in the flow line brings together melted and unmelted particles more effectively and rapidly and there is further accomplished a significantly improved mixing together of the melted material, additives, dyes and the like.

In carrying out the method of the invention, I have devised a special form of extruding apparatus which includes, in combination, an extruder barrel, an extruder screw specially formed with stepped-down portions of restricted diameter, and flow-diverting means located around the extruder screw portions of restricted diameter and held in stationary relationship to the inner peripheral surface of the extruder barrel.

The flow-diverting means may, for example, comprise a plurality of flow-diverting blades or vanes supported in a stationary position inside of the extruder barrel by means of an annular retaining body or ring which is located around the screw portions of reduced diameter. It should be understood that the invention is not limited to the use of an annular retaining body, and stationary vanes may be associated with the extruder barrel in other ways, and the method of diverting flow to induce turbulence may be carried out and other vane structures, as hereinafter described.

Referring more in detail to the method and apparatus illustrated in FIGS. 1 through 9, numeral 2 denotes an extruder member formed with a cylindrical barrel having a hopper portion 4 into which plastic material is introduced together with additives, dyes, and the like. An extruder screw member 6 is rotatably mounted in the barrel and driven by suitable power driving means, for example, through the pulley 8. At the outer end of the barrel 2 is located a die member 10, through which melted material may be extruded to form an extruded body 12 of some desired shape.

In accordance with one form of the invention, the extruder screw 6, as best shown in FIGS. 2 and 5, is formed with stepped-down portions 6a, 6b, 6c, 6d and 6e of progressively smaller diameters.

In combination with this specially formed extruder screw construction, I further provide flow-diverting means consisting of one or more annular supporting bodies or retaining rings on which are mounted a plurality of flow-diverting vanes. In FIG. 1, two retaining rings have been shown and indicated by the numerals 14 and 16. These retaining rings are all similar, and as noted in FIGS. 1 through 7, the retaining ring 14 is constructed and arranged to encircle the extruder screw portions of restricted diameter. It is pointed out that the inner diameter of ring 14 is greater than the diameter of the stepped-down portions 6a, 6b, 6c, 6d, so that the inner peripheral portion of the ring portion 14 is located in slightly spaced relation to adjacent stepped-down extruder screw surfaces, and the ring is, therefore, loosely supported and can be moved a short distance along the screw in either direction. It will be understood that this loose fitting may be desirable in some types of extruding. However, it should be further observed that the inner diameter of ring portion 14 at one end, i.e., the left hand end as viewed in FIG. 1, is less than the diameter of those portions of the extruder screw which have been reduced at 6a, so that the ring may be displaced rearwardly only a short distance before being engaged and held by the portion 6a.

At its opposite end, i.e., the right hand, as viewed in FIG. 1, the ring portion 14 is formed with an annular abutment part 14c which projects radially inwardly and is of a diameter only slightly greater than the diameter of portions 6d and is of a diameter less than 6e. This size relationship provides for the abutment part 14c engaged against adjacent relieved screw surface 6f, thus preventing any forward displacement beyond this engaged position.

As one method of assembling ring 14 around the extruder screw with the reduced diameters described above, the ring 14 may be made from two half sections which are joined together, for example, by lines of welding 14a and 14b, as is most clearly shown in FIG. 7. This provides for the half sections and vanes being separately constructed and secured around the restricted portions of a screw at a desired point. Thereafter, the extruder screw and ring assembly can be introduced into the barrel 2 as a single unit.

The flow-diverting vanes earlier referred to are located around the outer peripheral surface of the ring member 14 in circumferentially spaced apart relation and are denoted by numerals 18, 20, 22, 24, 26 and 28. These vanes are of generally rectangular shape and may be solidly attached to the ring by welding or they may be formed as an integral part of the ring 14. Each of the vanes is further positioned in an angularly disposed manner to facilitate flexing in a circumferential direction inside the barrel 2. Each vane is also chosen of a length such that the outer edges of the vanes all lie in a circle, of a diameter slightly exceeding the diameter of the barrel 2.

It will be understood that the ring body and vanes are preferably made of a metal such as spring steel, and also, the outer edges of each vane may be slightly beveled as indicated in FIG. 7 at 18a, 20a, 22a, 24a, 26a and 28a. With such an arrangement, the extruder screw and ring member may be introduced into the barrel 2 and by slightly rotating the screw in the barrel and forcing it inwardly, the beveled edges of the vanes may be progressively engaged against inner peripheral surfaces of the barrel with the vanes becoming flexed and compressed very slightly. When all of the vanes are compressed and engaged inside the barrel, they become held in tight frictional engagement with the inner peripheral surface of the barrel 2 to constitute stationary flow-diverting surfaces with the extruder screw being free to rotate inside of the ring member 14.

In operation, a mixture of plastic particles, additives, dyes and the like is introduced through the hopper 4. Heating takes place with heat being externally applied or generated by frictional pressure of the extruder screw 6 turning in the barrel 2. There is thus induced a helical flow of the melted mixture indicated at F in FIG. 8 wherein a flow path of generally helical configuration has been indicated diagrammatically. It will be observed that at a predetermined point, this helical flow is brought into contact with the flow-diverting vanes described as will be evident from an inspection of the dotted line in FIG. 8. As suggested in this figure, fully melted particles mixed with partially melted particles approach the vanes, end portions of the mixture are continuously sheared away, with the sheared-away portions being turned over and forced through short angularly directed passageways defined by the spaced apart vanes. In thus abruptly changing the direction of flow of the mass, a highly turbulent flow pattern is induced which is found to provide an intense mixing action at a localized region with unmelted particles becoming more rapidly fused and mixed with already melted particles.

In addition, the additives, dyes and the like are found to be dispersed and distributed throughout the mass in a highly uniform manner not heretofore realized in extruding processes, and the effect of this is evidenced by significantly improved quality and appearance of the product thus extruded.

Figure 9:
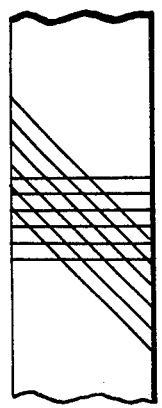
FIG. 9 is a detail view illustrating diagrammatically a shearing flow pattern set up in melted material in accordance with the method of the invention.

As the helical flow of melted mixed material is diverted a very large part of the flow passes between the vanes. However, small quantities may enter between the stepped-down portions of the screw and the inner periphery of the ring 14. I provide outlets 31, 33, etc., which are formed through the ring walls and through which material may emerge and be mixed together with other portions passing through the axial passageways. A second set of outlets is also provided at the forward end of the ring as indicated in the drawings by numerals 35, 37, etc., to provide for outward flow of material forced against the screw surface 6e. In FIG. 9, lines are shown in crossed relationship to illustrate diagrammatically the diverted flow pattern of sheared material.

Figure 10:
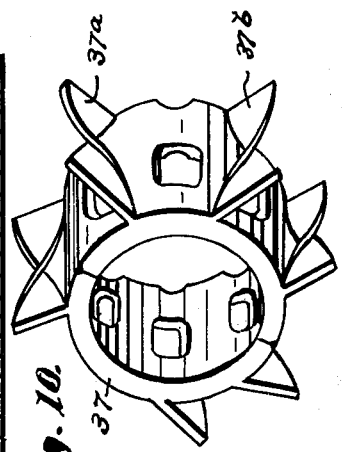
FIG. 10 is a detail view of a ring member having reversely formed vanes.

In carrying out the method of the invention, I have determined that I may control the extruding operation in various ways to obtain different results, depending on the materials to be processed. Thus I may vary the spacing of the screw flights and their angularity..I may also increase the number of ring and diverting vane units employed, as for example, two units such as 32, 34 and 36 in a barrel 2' on a screw 6', as illustrated in FIG. 11. FIG. 11 is also intended to illustrate a screw with a single restricted diameter portion as indicated at 38, 40 and 42. In FIG. 10 there is illustrated a ring member 37 having reversely curved vanes as 37a, 37b, etc.

In FIGS. 12 and 13, a modification of the invention illustrates a barrel 2'' having a screw 6'' on which a ring body 14' is provided with vanes as 18', 20', 22', etc., curved, as shown, to extend part way around the outer ring periphery in an interrupted helical-like manner. This vane arrangement provides passageways which tend to wind around the ring instead of extending linearly. FIG. 13 also shows the vanes curving in a direction from left to right, while FIG. 14 illustrates vanes as 18'', 20'', 22'', etc., in which the vanes curve from right to left on a ring 14''.

In FIGS. 15 and 16, there is illustrated an extruder screw barrel 50 in which is received an extruder screw 52, having a reduced portion 54. Formed in the barrel 50 are openings as 56, 58, 60, etc., through which are located vanes 62, 64, 66, etc., which are formed as an integral part of ring sections 68 and 70, adapted to be clamped together by means of vanes as 72 and 74 around the openings in the barrel to provide projecting vane ends which lie in spaced relation to the reduced section 54 of the screw 52. This arrangement provides another means of assembling vanes with a ring which is applied externally of the barrel and with the vanes being formed to extend radially inwardly.

FIGS. 17 and 18 illustrate another arrangement in which a ring member 80 formed in half sections and welded together is provided with vanes as 82, 84, 86, etc. This ring member may also be combined with a reduced section 88 of a screw 90 received in a barrel 92.

In FIG. 19, still another arrangement of ring member is shown in which a ring 94, made in half sections and welded together, is constructed with radially outwardly extending vanes 96a, 96b, 96c, etc., and also with radially inwardly extending vanes as 98a, 98b, 98c, etc.

I claim:

1. An apparatus for extruding a mass of melted plastic material, including, in combination, a cylindrical enclosure body for receiving the plastic material, an extruder screw mounted for rotative movement in the enclosure body for advancing melted material along the enclosure body in a helical path of flow, and flow-diverting means located within the cylindrical enclosure body for interrupting the helical path of flow and moving the melted mass through short restricted passageways in a turbulent flow pattern, said flow-diverting means consisting in a ring member and a plurality of spaced apart vanes supported on the ring member and extending radially inwardly and outwardly therefrom.

2. An apparatus for extruding a mass of melted plastic material, including, in combination, a cylindrical enclosure body for receiving the plastic material, an extruder screw mounted for rotative movement in the enclosure body for advancing melted material along the enclosure body in a helical path of flow, and flow-diverting means located within the cylindrical enclosure body for interrupting the helical path of flow and moving the melted mass through short restricted passageways in a turbulent flow pattern, said flow-diverting means consisting in a ring member and a plurality of spaced apart vanes supported on the ring member, said vanes being formed with a helically curved shape.

3. An apparatus for extruding a mass of melted plastic material, including, in combination, a cylindrical exclosure body for receiving the plastic material, an extruder screw mounted for rotative movement in the enclosure body for advancing melted material along the enclosure body in a helical path of flow, and flow-diverting means located within the cylindrical enclosure body for interrupting the helical path of flow and moving the melted mass through short restricted passageways in a turbulent flow pattern, said flow-diverting means consisting in a ring member and a plurality of circumferentially spaced-apart vanes supported on the ring member, and said vanes being formed with a reversely curved shape.

4. Apparatus for extruding a plastic material comprising an extruder screw barrel, an extruder screw mounted for rotative movement therein, said extruder screw being formed with a screw thread extending therearound and being interrupted to define separated thread sections which lie in closely spaced relation to the inner periphery of the barrel, and circumferentially spaced apart flow diverting vanes rigidly secured in the barrel and arranged to project radially inwardly between the said separated thread sections, said flow diverting vanes being located in slots formed in the extruder barrel, and said vanes being held in the slots by means of a clamping ring located around the outer peripheral surface of the exruder screw barrel.

5. An apparatus for extruding a mass of melted plastic material comprising an extruder screw member consisting in an elongated body having threaded portions extending helically around its longitudinal central axis, said extruder screw being formed with a cylindrical section of reduced diameter which interrupts the helical thread portions to define spaced apart thread sections, an extruder barrel having a cylindrical bore in which the extruder screw is received for rotative movement therewithin the inner peripheral surface of the barrel being located in closely spaced relationship to the said helically extending thread portions, sections of the extruder barrel occurring in radially spaced relation to the said sections of the extruder screw cylindrical section of reduced diameter being formed with circumferentially spaced slots extending longitudinally along the extruder barrel, a plurality of flow diverting vanes mounted in the said slots and projecting radially inwardly into close proximity to the cylindrical section of reduced diameter to provide shearing edges lying in the path of flow of a melted plastic material advanced through the barrel by rotative movement of the extruder screw, said flow diverting vanes being contained within a clamping ring solidly secured around the outer peripheral surface of the slotted extruder barrel.

6. An apparatus for extruding a mass of melted plastic material comprising an extruder screw member consisting in an elongated body having threaded portions extending helically around its longitudinal central axis, said extruder screw being formed with a cylindrical section of reduced diameter which interrupts the helical thread portions to define spaced apart thread sections, an extruder barrel having a cylindrical bore in which the extruder screw is received for rotative movement therewithin, the inner peripheral surface of the barrel being located in closely spaced relationship to the said helically extending thread portions, sections of the extruder barrel occurring in radially spaced relation to the said sections of the extruder screw cylindrical section of reduced diameter being formed with circumferentially spaced slots extending longitudinally along the extruder barrel, a plurality of flow diverting vanes mounted in the said slots and projecting radially inwardly into close proximity to the cylindrical sections of reduced diameter to provide shearing edges lying in the path of flow of a melted plastic material advanced through the barrel by rotative movement of the extruder screw, said vanes being formed with tapered head portions which fit into and mate with the said slots in the barrel and a clamping ring detachably secured around the barrel and located in abutting relationship to the tapered head of the vanes.

* * * * *